US005975605A

United States Patent [19]

Kot

[11] Patent Number: 5,975,605

[45] Date of Patent: Nov. 2, 1999

[54] ENCLOSED CLAMPING OR GRIPPING DEVICE WITH ACCESSIBLE LOAD CONTROLLING SPRING

[76] Inventor: Norbert J Kot, 955 S. Edwards St., Brookfield, Wis. 53005

[21] Appl. No.: 08/766,560

[22] Filed: Dec. 13, 1996

Related U.S. Application Data

[63] Continuation-in-part of application No. 08/338,346, Nov. 14, 1994, Pat. No. 5,688,014

[60] Provisional application No. 60/008,690, Dec. 15, 1995.

[51] Int. Cl.[6] ................................ B25B 5/12; B25J 15/08

[52] U.S. Cl. ............................ 294/115; 269/32; 269/224; 269/228; 294/88; 294/99.1

[58] Field of Search ........................... 294/86.4, 88, 99.1, 294/100, 104, 106, 110.1, 115; 269/32, 34, 224, 228; 901/31, 37–39

[56] References Cited

U.S. PATENT DOCUMENTS

| | | |
|---|---|---|
| 2,179,153 | 11/1939 | Jones . |
| 2,369,362 | 2/1945 | Marziani . |
| 3,204,947 | 9/1965 | Sendoykas et al. . |
| 3,302,943 | 2/1967 | Mericle, Jr. . |
| 3,347,542 | 10/1967 | Mericle, Jr. . |
| 3,497,255 | 2/1970 | Sindelar . |
| 3,512,824 | 5/1970 | Bautz et al. . |
| 3,614,151 | 10/1971 | Shadle . |
| 3,697,060 | 10/1972 | Kulson . |
| 3,782,162 | 1/1974 | Bullard . |
| 3,799,533 | 3/1974 | Malott . |
| 3,801,091 | 4/1974 | McPherson et al. . |
| 3,819,171 | 6/1974 | Sendoykas et al. . |
| 4,097,036 | 6/1978 | Henke . |
| 4,291,909 | 9/1981 | Coatantiec . |
| 4,473,249 | 9/1984 | Valentine et al. . |
| 4,540,211 | 9/1985 | Masserang . |
| 4,673,347 | 6/1987 | Ziegler . |
| 4,838,306 | 6/1989 | Horn et al. . |
| 4,905,975 | 3/1990 | Ruegg . |
| 5,171,004 | 12/1992 | Berchtold . |

FOREIGN PATENT DOCUMENTS

| | | |
|---|---|---|
| 1231498 | 9/1960 | France . |

*Primary Examiner*—Johnny D. Cherry

*Attorney, Agent, or Firm*—Ryan Kromholz & Manion

[57] ABSTRACT

A toggle clamp includes a movable first pin having an axis and a stationary second pin. An arm is carried by the first pin for rotation in a first direction applying pressure to a load and a second direction releasing the pressure. An exterior spring element is coupled between the first and second pins. The spring element exerts a spring force that biases the first pin toward the second pin. The spring element is releasable for exchange with another spring element to change the spring force.

5 Claims, 3 Drawing Sheets

Fig. 4
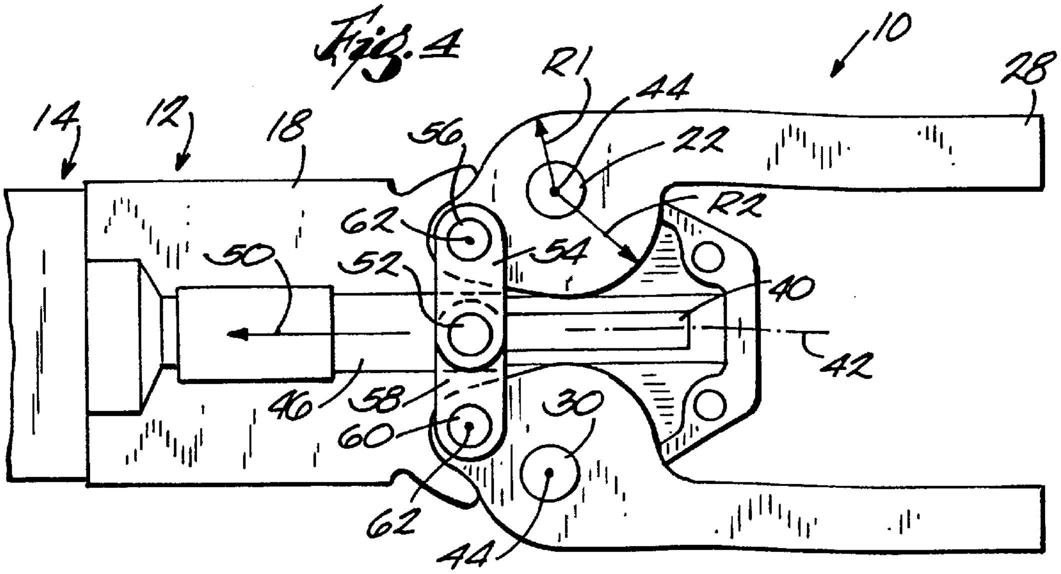
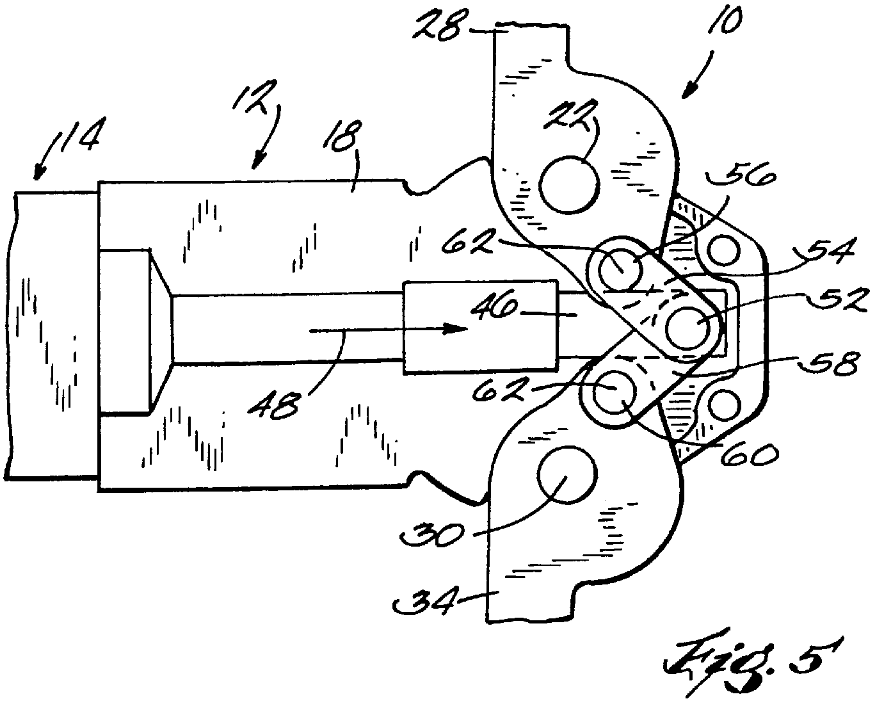
Fig. 5

ENCLOSED CLAMPING OR GRIPPING DEVICE WITH ACCESSIBLE LOAD CONTROLLING SPRING

RELATED APPLICATIONS

This application is a continuation-in-part of Provisional application Ser. No. 60/008,690 filed Dec. 15, 1995; and a continuation-in-part of application Ser. No. 08/338,346 filed Nov. 14, 1994, now U.S. Pat. No 5,688,014.

FIELD OF THE INVENTION

The invention pertains to power-operated toggle clamps and grippers.

BACKGROUND OF THE INVENTION

Conventional toggle clamps comprise at least one clamping arm that is pivotally connected through links to a base support. It is well known that, as the links toggle, a point is reached and passed at which the compressive and tension stresses in the links and clamp arm are theoretically infinitely large.

The internal stress in the links and the clamping arm is relieved to some extent by their inherent (albeit slight) elasticity, which can save the parts from fracturing. Still, one undesirable consequence of the great unpredictable internal stress occurring at the toggle point is that the pins connecting the links and the pin on which the clamp arm swings are subject to a powerful shearing force. Since there is no motion between the pivot points and the links at the toggle point, the high shearing or bearing stress causes rapid wear of the pins and/or in the links, which are journaled on the pins. If the size of the article being clamped varies by as little as 0.015 inch (0.38 mm) the clamping force can vary by 25%–50%.

If the article size exceeds specifications, internal stress of the clamp parts is even greater. If the article size is under specification, the article may slip in the clamp which can result in damage to property or injury to a person in an industrial setting.

Furthermore, clamps or grippers without mechanical locking can release parts during a pressure loss or pressure drop. The failure at an unclamped condition can occur when pressure decreases after locking. When the pressure decreases, the cylinder has less available force to open. This problem is aggravated by mechanisms designed to clamp on the advance stroke of the cylinder.

A number of clamp manufacturers have moved to so-called "Wedge Locking" designs in order to avoid the toggle unlocking problem. Wedge Locking clamps are designed to stop before reaching a locked position and therefore are not true locking mechanisms. Under severe vibration, wedge clamps can lose mechanical locking.

Furthermore, current enclosed clamp designs have a cantilevered shaft protruding from the side of the clamp where the arm is attached. This type of loading causes bending, torsion, and shear loading, severely reducing the load capacity of the clamp.

These shortcomings, taken alone or in combination, call for improved clamping and gripping devices.

SUMMARY OF THE INVENTION

One aspect of the invention provides a toggle clamp whose operating characteristics can be easily changed. The clamp comprises a frame having an exterior. A first pin having an axis is supported by the frame for movement transverse of the axis. A second pin having an axis parallel to the axis of the first pin is supported by the frame against movement. An arm is carried by the first pin for rotation about the axis of the first pin in a first direction applying pressure to a load and a second direction releasing the pressure. The clamp includes a spring element on the exterior of the frame, which is coupled between the first and second pins. The spring element exerts a spring force that biases the first pin toward the second pin. The spring element maintains symmetric loading on the two pins. The spring element, being accessible on the exterior of the frame, can be readily released and exchanged with another spring element to change the spring force.

Another aspect of the invention provides a toggle clamp having improved performance during partial or total actuator failure. The clamp is adapted for connection to an actuator of the type that applies force in an advance stroke and in a retract stroke. The clamp comprises a movable first pin and a stationary second pin. A spring element is coupled between the first and second pins and exerts a spring force that biases the movable first pin toward the stationary second pin. An arm is carried by the first pin for rotation in a first direction applying pressure to a load and a second direction releasing the pressure from the load. The clamp includes linkage coupled to the arm. The linkage is adapted and arranged for connection to the actuator to rotate the arm in the first direction, applying pressure to the load, during the retract stroke and to rotate the arm in the second direction, releasing pressure from the load, during the advance stroke.

In the event of total actuator failure, the spring element maintains the arm in a condition applying pressure to the load. Still, the spring force can be selected to permit the operator to manually return the arm to a condition releasing pressure from the load. In the case of partial failure of the actuator, the linkage returns the arm to the pressure release condition during the advance stroke, thus making available greater force to unlock the clamp.

In a preferred embodiment, the clamp is totally enclosed to assure reliable operation possible under harsh conditions.

Other features and advantages of the invention will be pointed out in, or will be apparent from, the drawings, specification and claims that follow.

BRIEF DESCRIPTION OF THE DRAWINGS

FIG. 4 is a side view of the interior of the gripping device shown in FIG. 1, with the gripping arms located in their clamping position;

FIG. 5 is a side view of the interior of the gripping device shown in FIG. 1, with the gripping arms located in their unclamping position.

Figure 1:
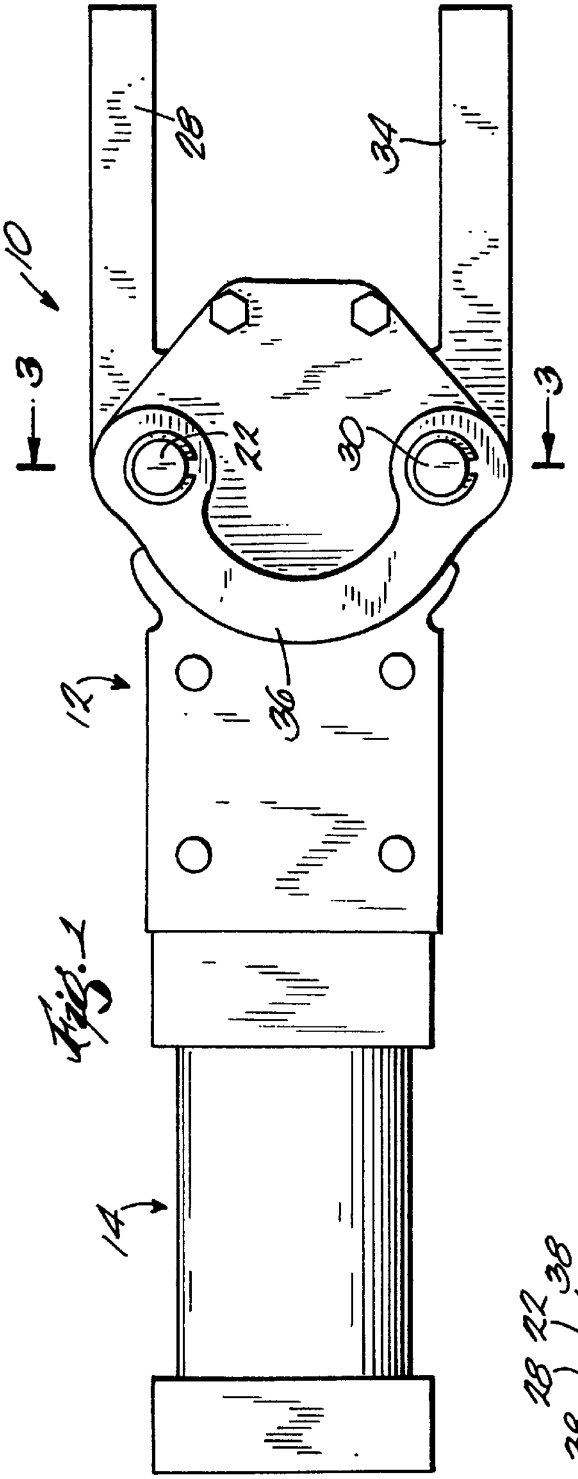
FIG. 1 is a side view of the exterior of a gripping device that embodies features of the invention.

The invention is not limited to the details of the construction and the arrangements of parts set forth in the following description or shown in the drawings. The invention can be practiced in other embodiments and in various other ways. The terminology and phrases are used for description and should not be regarded as limiting.

DESCRIPTION OF THE PREFERRED EMBODIMENTS

Figure 2:
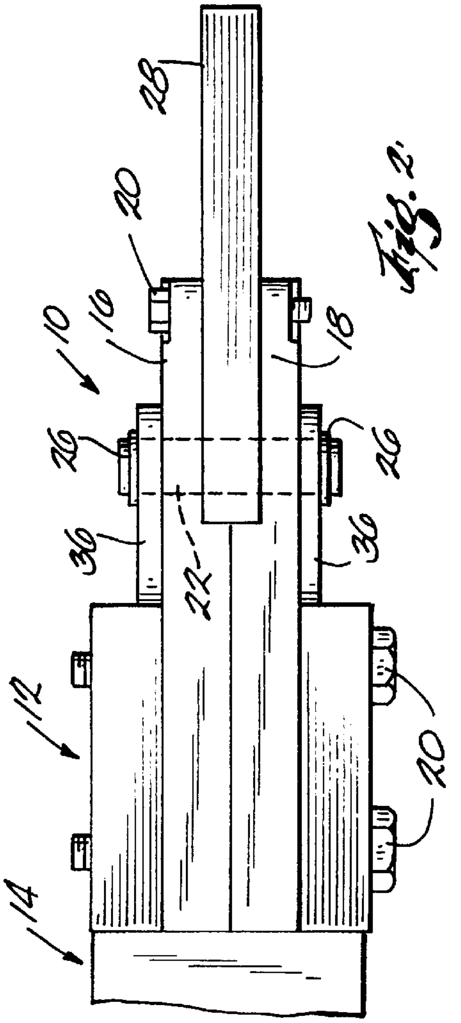
FIG. 2 is a top view of the exterior of the gripping device shown in FIG. 1.
Figure 3:
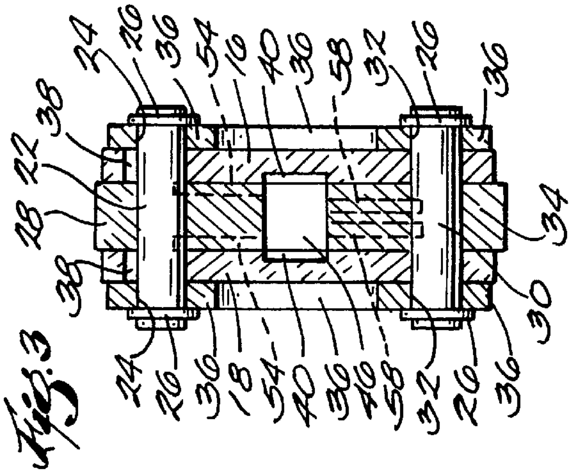
FIG. 3 is an end sectional view of the device shown in FIG. 1, taken generally along line 3—3 in FIG. 1.

FIGS. 1 to 3 show a clamping device 10 attached to a base 12 and coupled to a hydraulic or pneumatic actuator 14. As best shown in FIGS. 2 and 3, the clamping device 10 includes a right side casting body 16 and a left side casting body 18 aligned and joined by bolts 20.

A top main pivot pin 22 passes through opposing holes in the casting bodies 16 and 18, secured by retaining rings 26. The top main pivot pin 22 carries a top gripping arm 28. The top gripping arm 28 rotates about the top main pivot pin 22.

As FIG. 3 best shows, the holes 24 through which the top main pivot pin 22 passes are enlarged beyond the outside diameter of the pivot pin 22. Movement of the top main pivot pin 22 within the holes 24 is thereby allowed.

A bottom main pivot pin 30 passes through opposing holes 32 in the casting bodies 16 and 18, also secured by retaining rings 26. The bottom main pivot pin 30 carries a bottom gripping arm 34. The bottom gripping arm 34 rotates about the bottom main pivot pin 30.

As FIG. 3 best shows, the holes 32 through which the bottom main pivot pin 30 passes are not elongated beyond the outside diameter of the bottom main pivot pin 30. Thus, substantially no movement of the bottom main pivot pin 30 is allowed. The bottom main pivot pin 30 is essentially stationary.

Springs 36 are coupled between the top and bottom main pivot pins 22 and 30 at both ends of the pivots pins 22 and 30, which are exposed for access from the exterior of the casting bodies 16 and 18. The springs 36 normally bias the top main pivot pin 22 toward the bottom main pivot pin 30. The bias of the springs 36 normally leaves a gap 38 (see FIG. 3) within the oversized holes 24 through which the top main pivot pin 22 passes. As FIG. 3 shows, the spring normally biases the top main pivot pin 22 so that the gap 38 exists above the pin 22. The top main pivot pin 22 is thereby allowed to float within the gap 38, subject to the spring bias.

As FIGS. 3 and 4 show, an interior groove 40 is formed in the mating casting bodies 16 and 18. The groove 40 has an axis 42 (see FIG. 4), which extends transverse to the parallel axes 44 of the top and bottom main pivot pins 22 and 30.

As FIGS. 4 and 5 show, a slider 46 is coupled to the actuator 14 for lateral movement within the groove 40. The actuator is of a conventional type that has an advance stroke and a retract stroke.

Advancement of the actuator (arrow 48 in FIG. 5) moves the slider 46 in a forward direction, toward the gripping arms 28 and 34. Retraction of the actuator (arrow 50 in FIG. 4) moves the slider 46 in a rearward direction, away from the gripping arms 28 and 34.

The slider 46 carries a pivot pin 52. A pair of upper links 54 are attached at opposite ends of the slider pivot pin 52 (see FIGS. 3 to 5). The opposite ends of the upper links 54 are commonly attached to an upper link pivot pin 56 carried by the top gripping arm 28. The upper link pivot pin 56 is located rearwardly of and is axially displaced from the top main pivot pin 22.

A pair of lower links 58 are attached at one end to the slider pivot pin 52, radially inboard of the upper links 54 (see FIG. 3). The opposite ends of the lower links 58 are commonly attached to a lower link pivot pin 60 carried by the bottom gripping arm 34. The lower link pivot pin 60 is located rearwardly of and is axially displaced from the bottom main pivot pin 30. The axes 62 of the upper and lower link pivot pins 56 and 60 are mutually aligned in a spaced apart and parallel relationship.

The upper and lower links 54 and 58 translate linear movement of the slider 46 into synchronized rotational movement of the gripping arms 28 and 34. When the slider 46 is in its rearward most position (as FIG. 4 shows), the gripping arms 28 and 34 are mutually disposed in a clamping position. As the actuator advances (arrow 48 in FIG. 5), movement of the slider 46 in the forward direction pivots the upper and lower links 54 and 58 in synchrony about the slider pivot pin 52 and about the upper and lower link pivot pins 56 and 60. The gripping arms 28 and 34 pivot in synchrony about the top and bottom main pivot pins 22 and 30 away from each other, from the clamping position to an unclamping position (shown in FIG. 5). As FIG. 5 shows, the gripping arms 28 and 34 open a full ninety degrees when in the unclamping position for maximum tooling clearance.

Likewise, as the actuator retracts (arrow 50 in FIG. 4), movement of the slider 46 in the rearward direction pivots the links 54 and 58 in synchrony about the slider pivot pin 52 and about the upper and lower link pivot pins 56 and 60, to pivot the gripping arms 28 and 34 about the top and bottom main pivot pins 22 and 30 from the unclamping position to the clamping position (shown in FIG. 4).

As the gripping arms 28 and 34 move from the unclamping position toward the clamping position (i.e., as the actuator retracts), the links 54 and 58 toggle as they pass through vertical. Once beyond vertical in the forward direction, the links 54 and 58 mechanically lock the gripping arms 28 and 34 in the clamping position.

With conventional actuators, actuator advancement will typically provide greater force than actuator retraction, because there is generally less pressure area on the retraction side of an actuator stroke. By virtue of the above described construction, the gripping arms 28 and 34 are movable to the unclamping position (FIG. 5) during advancement of the actuator 14 (arrow 48 in FIG. 5). Thus, should the actuator 14 fail partially, thereby decreasing the overall available actuation force, the device 10 nevertheless provides greater application of remaining force by employing an advancement stroke to release a load.

Should the actuator 14 fail completely when the gripping arms 28 and 34 are in their clamping position, the bias of the springs 36 will maintain the toggled, mechanically locked condition of the links 54 and 58. Still, in the absence of actuator force to release the load, the operator need only overcome the biasing force of the springs 36 to move the gripping arms 28 and 34 to their unclamping position, thereby releasing the load.

By virtue of the above described construction, loads applied to the top gripping arm 28 are transmitted through the top main pivot pin 22 to both springs 36. As the springs 36 deflect, the top main pivot pin 22 will float in the gap 38. The springs 36 thereby serve to distribute the load evenly along the axes 44 of both top and bottom main pivot pins 22 and 30. Symmetrical loading through the center of the top and bottom main pivot pins 22 and 30 reduces the chance of failure caused by unequal load distribution.

In the illustrated and preferred embodiment (see FIG. 2), the springs 36 are accessible from the exterior of the device 10. This accessibility permits easy repair and replacement of springs 36. The operating characteristics of the device 10 can therefore be readily adjusted by interchanging springs 36 having different spring constants. The springs 36 shown in the preferred embodiment are C-shaped, or curved beam types. Values for load, deflection, and stress for curved beam types are known and readily available.

For example, the spring constant values can be varied, by interchanging springs 36, to regulate stress to control loads and deflections. As another example, the spring constant values can be varied, by interchanging springs 36, to regulate load pressure and to regulate load release force, should actuator failure occur. A constant load can be achieved using springs 36 with a constant load output. As another example, the spring constant values can be varied, by interchanging springs 36, to change the gripping range (gripping range is the ability of the clamp or gripper to hold parts that vary (substantially) in size). Gripping range can be increased by selecting springs 36 having greater deflection. Changes in part tolerance as small as 0.010 inch can cause clamping forces to increase or decrease as much as 50%. This can result in an unclamped condition producing scrap parts, broken tools, or personal injury. The device 10 makes possible the quick interchange of springs 36 to adjust to changing load demands.

Furthermore, greater strength and manufacturing economy are gained by placing the springs 36 in the location shown in the drawings, instead of on a gripping arm 28 or 34. If the spring is placed at the end of the gripping arm, the distance between the gripping arm and the part being gripped must increase to accommodate the spring. Any other location of the spring on the gripping arm may require decreasing the strength of the arm.

As best shown in FIGS. 4 and 5, the device 10 is fully enclosed. The two radii R1 and R2 of the gripping arms 28 and 34 (see FIG. 4) maintain close contact with the casting bodies 16 and 18 during arm rotation. Close tolerances between the gripping arms 28 and 24 and the casting bodies 16 and 18 are thereby maintained. The close tolerances lead to small openings, which keep debris from entering the interior of the device 10. A totally enclosed design allows the device to operate in harsh conditions. This is especially important in welding conditions, where weld spatter can jam the clamp or gripper mechanism.

Seals could be placed at the openings, to further eliminate even the smallest particles from entering the mechanism, but in most cases the extremely small opening should be enough to filter debris.

Figure 6:
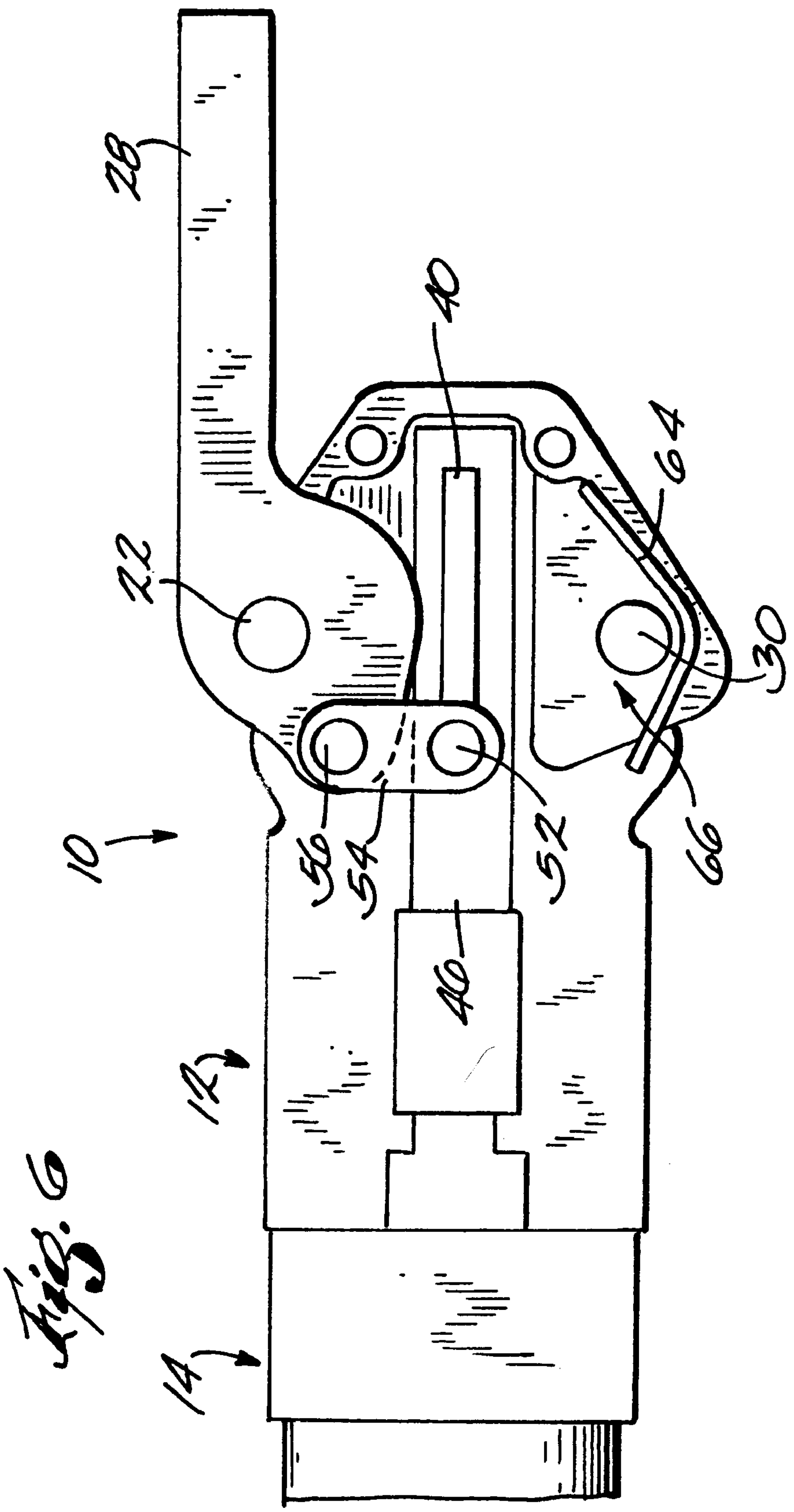
FIG. 6 is a side view of the device shown in FIG. 1 configured as a clamping device.

As FIG. 6 demonstrates, the device 10 is capable of operating as a clamp, using a single gripping arm 28. If a single gripping arm 28 is used, the springs 36 are still anchored between the top and bottom main pivot pins 22 and 30 in the manner shown in FIG. 1. As FIG. 6 shows, a plate 64 is provided to close the area 66 where the gripping arm 34 is removed.

Features and advantages of the invention are set forth in the following claims.

I claim:

1. A toggle clamp for connection to an actuator of the type that applies force in an advance stroke and in a retract stroke, the clamp comprising a frame, a first pin having an axis and supported by the frame for movement transverse of the axis, a second pin having an axis parallel to the axis of the first pin and supported by the frame against movement, a spring element coupled between the first and second pins and exerting a spring force that biases the first pin toward the second pin, an arm carried by the first pin for rotation about the axis of the first pin in a first direction applying pressure to a load and a second direction releasing the pressure, and linkage coupled to the arm, being adapted and arranged for connection to the actuator to rotate the arm in the first direction during the retract stroke and to rotate the arm in the second direction during the advance stroke.

2. A clamp according to claim 1 wherein the frame has an exterior and an interior, wherein the spring is releasably coupled between the first and second pins and exposed for access on the exterior of the frame, and wherein the linkage is enclosed in the interior of the frame.

3. A clamp according to claim 1 wherein the arm is movable in the first direction to a load engaging position and in the second direction to a load releasing condition, and wherein the load engaging position is spaced generally ninety degrees from the load releasing position.

4. A clamp according to claim 1 wherein the spring force is generally constant.

5. A toggle clamp comprising a frame having an exterior, a first pin having an axis and supported by the frame for movement transverse of the axis, a second pin having an axis parallel to the axis of the first pin and supported by the frame against movement, an arm carried by the first pin for rotation about the axis of the first pin in a first direction applying pressure to a load and a second direction releasing the pressure, and a spring element on the exterior of the frame coupled between the first and second pins and exerting a spring force that biases the first pin toward the second pin, the spring element being releasable for exchange with another spring element to change the spring force.

* * * * *